United States Patent
Millmann (10) Patent No.: US 6,599,030 B1
(45) Date of Patent: Jul. 29, 2003

(54) METHOD FOR POLISHING A FIBER OPTIC CONNECTOR

(75) Inventor: Calvin T. Millmann, Richfield, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 10/071,856

(22) Filed: Feb. 8, 2002

(51) Int. Cl.$^7$ .................................................. G02B 6/36
(52) U.S. Cl. ......................................................... 385/85
(58) Field of Search ..................................... 385/85, 78

(56) References Cited

U.S. PATENT DOCUMENTS

| | | | | |
|---|---|---|---|---|
| 4,666,241 A | * | 5/1987 | Caron | 385/85 |
| 4,743,084 A | * | 5/1988 | Manning | 385/84 |
| 5,461,689 A | * | 10/1995 | Matsuoka et al. | 385/85 |
| 5,465,314 A | * | 11/1995 | Jie et al. | 385/85 |
| 5,559,916 A | * | 9/1996 | Terao et al. | 385/85 |
| 5,631,986 A | * | 5/1997 | Frey et al. | 385/78 |
| 5,966,485 A | * | 10/1999 | Luther et al. | 385/85 |
| 6,120,359 A | * | 9/2000 | Ohno et al. | 451/59 |
| 6,142,676 A | | 11/2000 | Lu | 385/60 |
| 6,157,863 A | * | 12/2000 | Chandler et al. | 700/56 |
| 6,276,842 B1 | * | 8/2001 | Xu et al. | 385/85 |

OTHER PUBLICATIONS

"ADC Fiber Optic Technical Seminar," *ADC Telecommunication, Inc.*, First Edition, Issue 2, pp. 6.1–6.50 (Mar. 1997).
"ADC FasTerm™ Multimode LX.5 Connector Installation Instructions," *ADC Telecommunications, Inc.*, Issue 1, pp. 1–25 (Jun. 1999).
"ADC FasTerm™ Multimode LX.5 Connector Installation Instructions," *ADC Telecommunication, Inc.*, Issue 1, pp. 1–27 (Mar. 2001).
"ADC FasTerm™ Multimode LX.5 Connector Installation Instructions," *ADC Telecommunications, Inc.*, Issue 2, pp. 1–25 (Apr. 2001).
"Assembly Instructions for LC™ Fiber Optic Behind–The–Wall (BTW) Connectors," *Lucent Technologies, Bell Labs Innovations*, Issue 3, pp. 1–35 (Jul. 1999).
"Figs. 1 and 2 and the Background of the present application relating to admitted prior art" 4 pages (Filed Feb. 8, 2002).

* cited by examiner

Primary Examiner—Lynn Feild
Assistant Examiner—Hae Moon Hyeon
(74) Attorney, Agent, or Firm—Merchant & Gould P.C.

(57) ABSTRACT

A method for polishing an end face of a ferrule is disclosed herein. The ferrule includes an opening in which an optical fiber is positioned. The method includes the step of recessing an end of the optical fiber relative to the end face of the ferrule. The method also includes the step of polishing the end face of the ferrule after the end of the optical fiber has been recessed.

20 Claims, 10 Drawing Sheets

METHOD FOR POLISHING A FIBER OPTIC CONNECTOR

FIELD OF THE INVENTION

The present invention relates generally to methods for manufacturing fiber optic connectors. More particularly, the present invention relates to methods for polishing fiber optic connectors to improve the performance characteristics of the connectors.

BACKGROUND OF THE INVENTION

Fiber optic connectors are used to terminate the ends of fiber optic cables. There are many different fiber optic connector types. Example types of fiber optic connectors include FC-type, SC-type, ST-type and D4-type.

Figure 1:
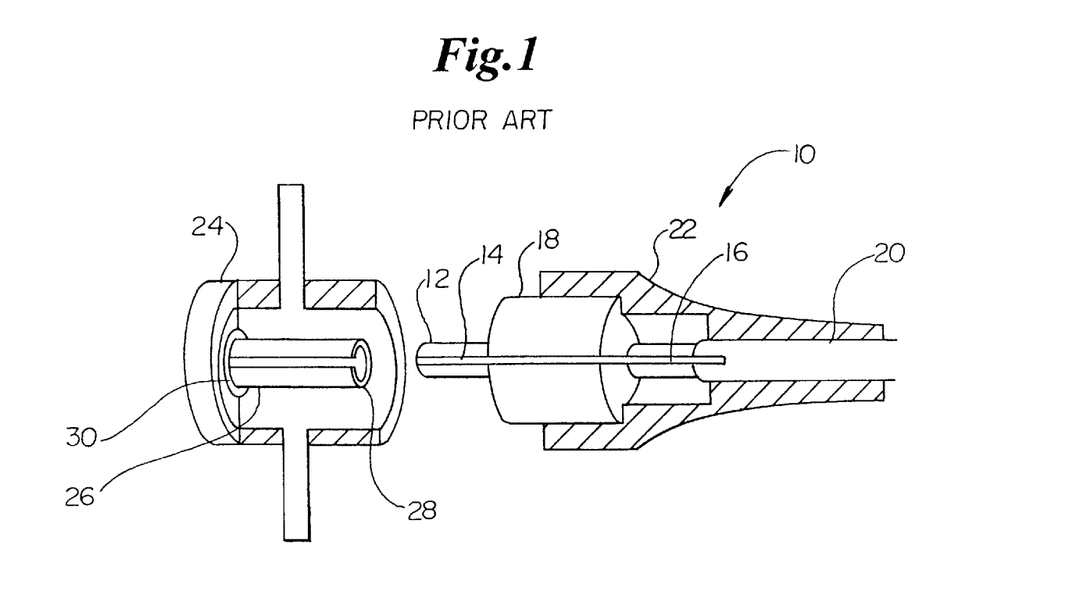
FIG. 1 illustrates a typical prior art connector.

FIG. 1 shows a typical connector 10. A ferrule 12 is located inside the connector 10. The ferrule 12 is a relatively long, thin cylinder preferably made of a material such as ceramic. Other materials such as metal or plastic can also be used to make the ferrule 12. The ferrule 12 defines a central opening 14 sized to receive a fiber 16 of a given cladding diameter. An epoxy is typically placed into the opening 14 prior to inserting the fiber 16 to hold the fiber 16 in place. The ferrule 12 functions to align and center the fiber 16, as well as to protect it from damage.

Referring still to FIG. 1, the ferrule 12 is supported within a connector body 18 typically made of a material such as metal or plastic. The connector body 18 is typically bonded to fiber optic cable 20 (e.g., the cable 20 can include a reinforcing layer made of a material such as Kevlar that is affixed to the connector 18). A strain relief boot 22 protects the junction between the connector 18 and the cable 20.

Two connectors are preferably interconnected through the use of an adapter 24. Adapter 24 includes a sleeve 26 sized to receive the ferrules of the connectors desired to be connected. For example, ferrule 12 of connector 10 is inserted into a first end 28 of the sleeve 26, while a ferrule (not shown) of a connector desired to be connected to the connector 10 is inserted into a second end 30 of the sleeve 26. As so inserted, the ends of the ferrules abut one another within the sleeve 26 such that their corresponding fibers are held in alignment with one another.

Parameters for evaluating the performance of a connector include insertion loss and return loss. Insertion loss is the measurement of the amount of power that is transferred through a coupling from an input fiber to an output fiber. Return loss is the measurement of the amount of power that is reflected back into the input fiber.

If the back reflection is too great (minimum return loss), it can interfere with the operation of the light source (particularly in single mode systems). Therefore, it is important to minimize the back reflection. For instance, a single mode interconnection with flat end finish can have a return loss of 11 dB which means the return loss is 11 dB down from the incident energy. In other words, if 500 microwatts of energy reaches the fiber end, 40 microwatts would be reflected back. By assuring fiber to fiber contact (eliminating air between the fibers), the return loss can be lowered to over 30 dB which means 500 microwatts would reflect only 0.5 microwatts. The return loss can be even further lowered by polishing the ends of the ferrules to have a rounded polish instead of a flat finish. By round polishing the ends of ferrules, the telecommunications industry has been able to consistent meet the minimum specification of 50 to 55 decibels.

Figure 2:
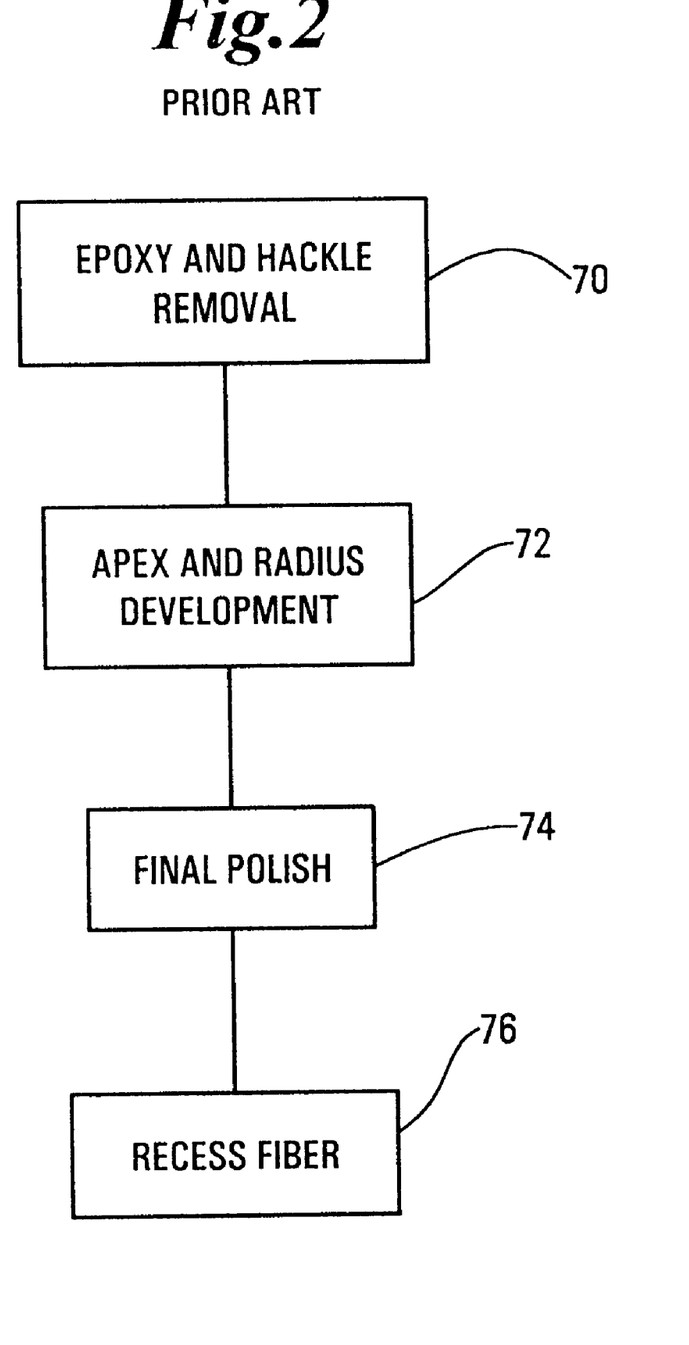
FIG. 2 illustrates a prior art polishing technique.

FIG. 2 is a block diagram showing the steps of a convention ferrule polishing technique for providing a rounded ferrule tip. During a first polishing step 70, a hackle of the fiber and residue epoxy are removed from the ferrule tip typically by a hand-sanding process. After the hackle and epoxy have been removed, the tip of the ferrule is machine polished using two or more polishing films (e.g., of varying coarseness) so as to more precisely form an apex and radius into the tip of the ferrule (see step 72). Next, the tip of the ferrule is machine polished with a final polish film as indicated by step 74. During the polishing process, an index layer is formed at the tip of the fiber within the ferrule. The index layer has undesirable optical properties. Thus, at final step 76, the tip of the ferrule is polished with a cerium oxide film causing the fiber to be recessed slightly into the ferrule a distance sufficient to remove the index layer.

SUMMARY OF THE INVENTION

One aspect of the present invention relates to a fiber optic connector polishing method that yields connectors having improved operating parameters.

A variety of advantages of the invention will be set forth in part in the description that follows, and in part will be apparent from the description, or may be learned by practicing the invention. It is to be understood that both the foregoing general description and the following detailed description are exemplary and explanatory only and are not restrictive of the invention as claimed.

BRIEF DESCRIPTION OF THE DRAWINGS

The accompanying drawings, which are incorporated in and constitute a part of the specification, illustrate several aspects of the invention and together with the description, serve to explain the principles of the invention. A brief description of the drawings is as follows.

While the invention is amenable to various modifications and alternative forms, the specifics there have been shown by way of example in the drawings and will be described in detail below. It is to be understood, however, that the intention is not to limit the invention to a particular embodiment. On the contrary, the intention is to cover all modifications, equivalents and alternatives falling within the scope of the invention as defined by the appended claims.

DETAILED DESCRIPTION

In the following detailed description, references are made to the accompanying drawings that depict various embodiments in which the invention may be practiced. It is to be understood that other embodiments may be utilized, and that structural and functional changes may be made without departing from the scope of the present invention.

Return loss is an important criteria for evaluating the performance of a fiber optic connector. It has been determined by the inventors that the return loss characteristics of a given fiber optic connector can be significantly improved by modifying the conventional polishing sequence set forth in FIG. 2. Specifically, the inventors have determined that ferrules manufactured by recessing the fiber tip prior to conducting the final polish step consistently exhibit improved return loss characteristics as compared to ferrules manufactured by recessing the fiber tip after the final polish step. A polishing method that is a non-limiting example demonstrating of the present invention is set forth below.

I. General Description of Polishing Method

Figure 3:
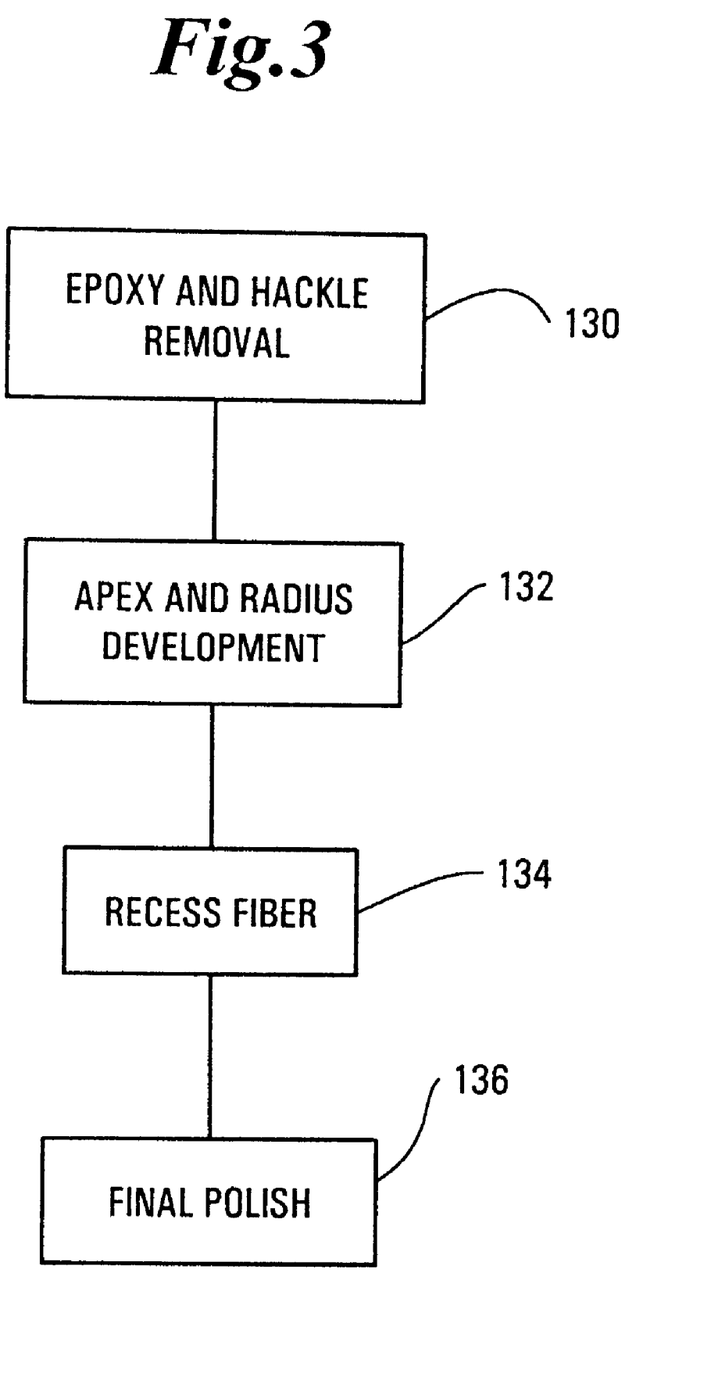
FIG. 3 shows a ferrule polishing sequence that is an embodiment of the present invention.

FIG. 3 shows an example of a polishing method in accordance with the principles of the present invention. The polishing method is adapted for use on a ferrule such as the ferrule 220 of FIG. 4. The ferrule 220 includes an optical fiber 222 mounted within a central passage 224 of the ferrule 220. The optical fiber 222 is held within the passage 224 by epoxy. An end face 228 of the ferrule 220 is shown including a pre-manufactured radius/curvature, but could also be flat. Prior to implementing the method, residue epoxy 226 is located on an end face 228 of the ferrule 220, and a hackle portion 230 of the optical fiber 222 extends beyond the end face 228.

Figure 5:
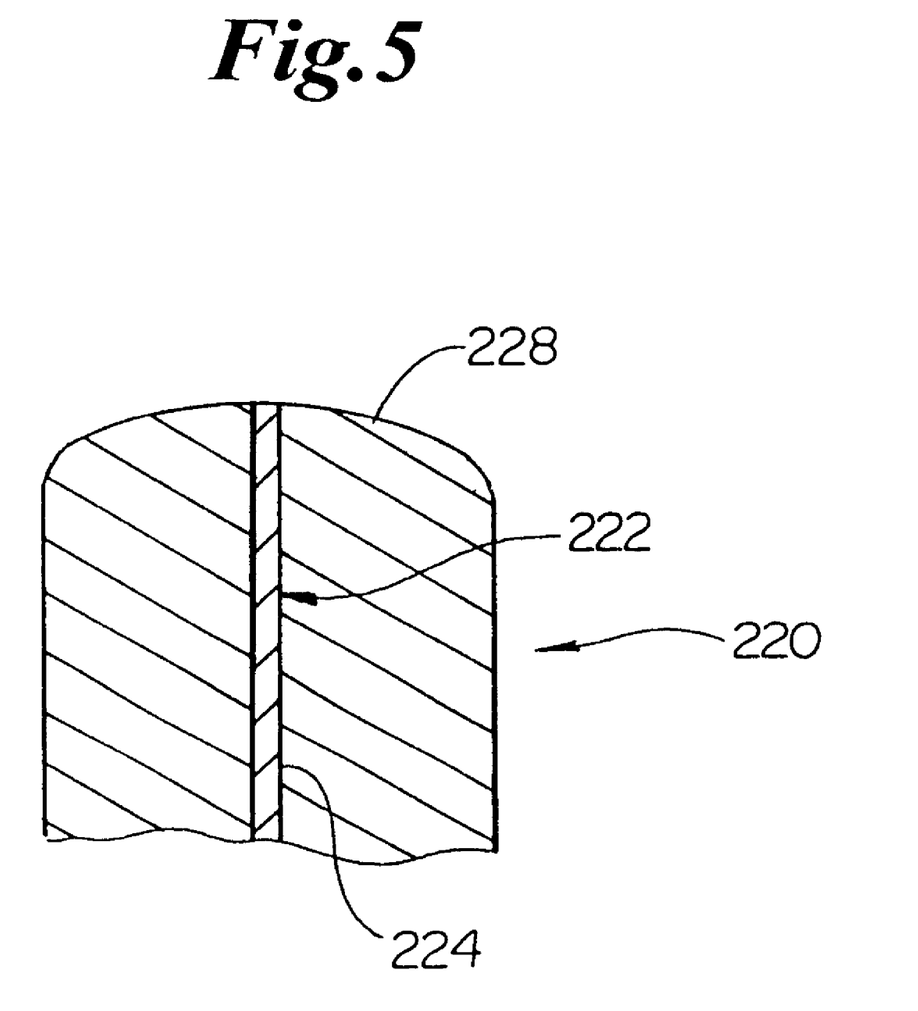
FIG. 5 illustrates the ferrule of FIG. 4 after the epoxy and hackle have been removed.

At step 130 of FIG. 3, the residue epoxy 226 and hackle 230 are removed preferably using a polishing process. FIG. 5 shows the ferrule 220 after the hackle portion 230 and the residue epoxy 226 have been removed.

Figure 6:
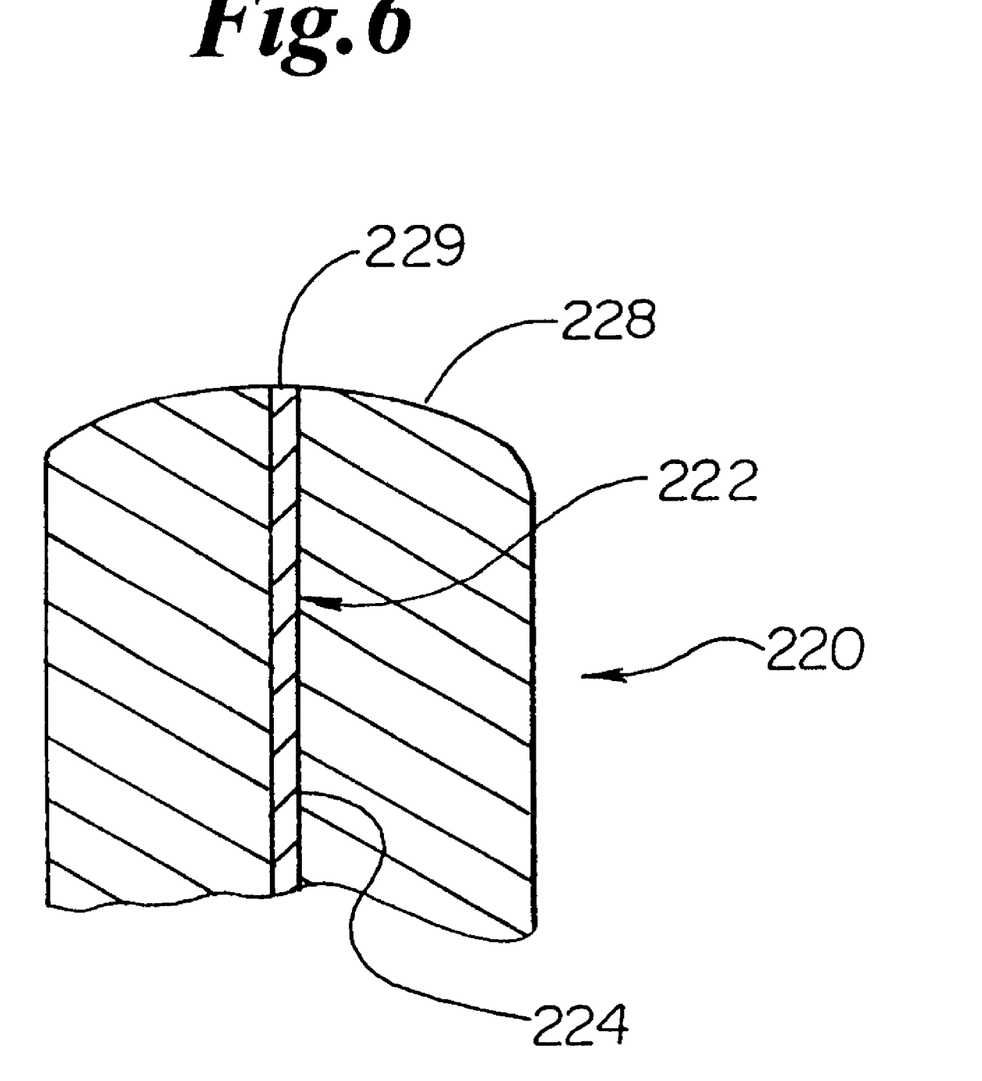
FIG. 6 illustrates the ferrule of FIG. 5 after an apex and radius development polishing process.

After the epoxy 226 and hackle 230 have been removed, the end face 228 of the ferrule 220 is polished to more precisely define a desired apex and radius (see step 132 of FIG. 3). This can be done by any number of different techniques. In one example, two or more different types of polishing film are used sequentially to form a desired radius in the end face 228. FIG. 6 shows the ferrule 220 after the apex and radius have been developed. As the radius and apex are formed in the end face 228, it is preferred to progressively use polishing films having less abrasive characteristics.

Figure 7:
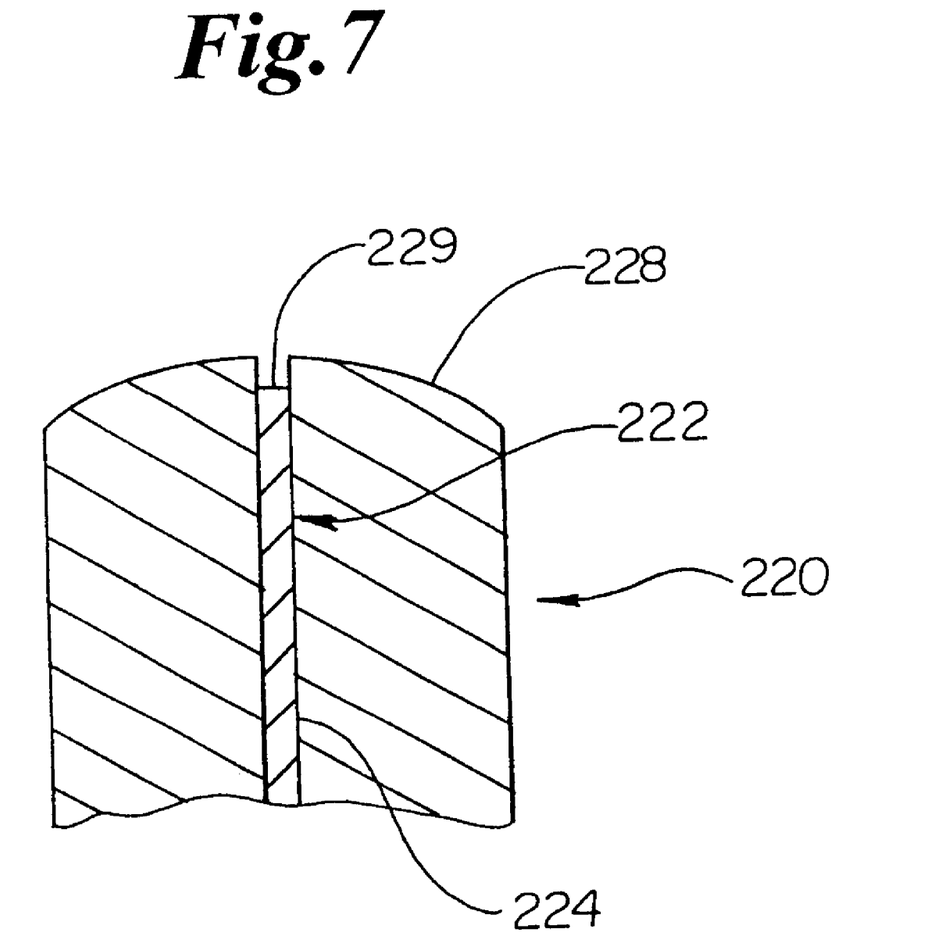
FIG. 7 illustrates the ferrule of FIG. 6 after a fiber recessing step.

After the apex and radius have been formed in the end face 228, the tip/end 229 of the optical fiber 222 is preferably recessed within the end face 228 to remove the index layer formed during the previous polishing steps (see step 134 of FIG. 3). The end 229 of the fiber can be recessed by any number of known mechanical, chemical or combined mechanical/chemical techniques. FIG. 7 shows the ferrule 220 after the end 229 of the fiber 222 has been recessed relative to the end face 228.

Figure 8:
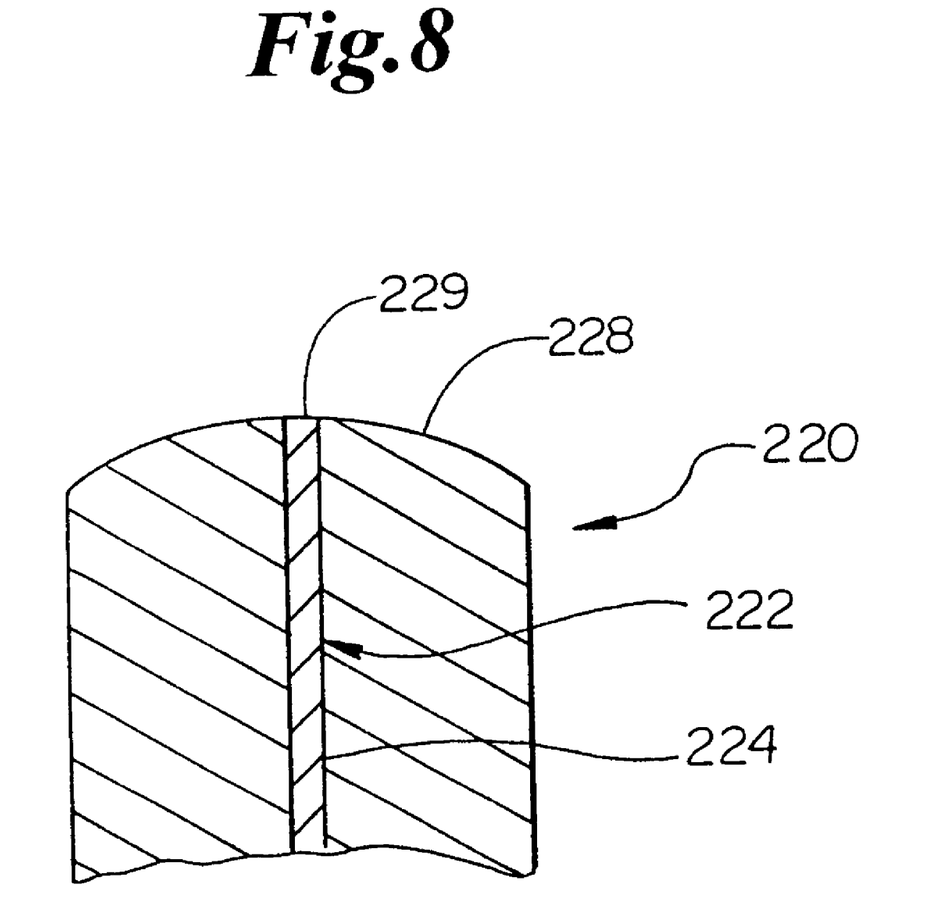
FIG. 8 illustrates the ferrule of FIG. 7 after a final polish step.

As a final step 136, the end face 228 of the ferrule 220 is polished using a final polishing film. In some embodiments, the ferrule 220 is polished so as to bring the end face 228 flush with the tip 229 of the optical fiber 222 (see FIG. 8). In other embodiments, the tip of the fiber 222 can remain slightly recessed after the final polish. In still another embodiment, the tip of the fiber can project outwardly a slight amount from the end face 228. It has been determined by the inventors that the above-identified manufacturing process enables the ferrule 220 to consistent meet a 57 decibel minimum for return loss.

II. Detailed Example of Epoxy and Hackle Removal Method

Figure 9:
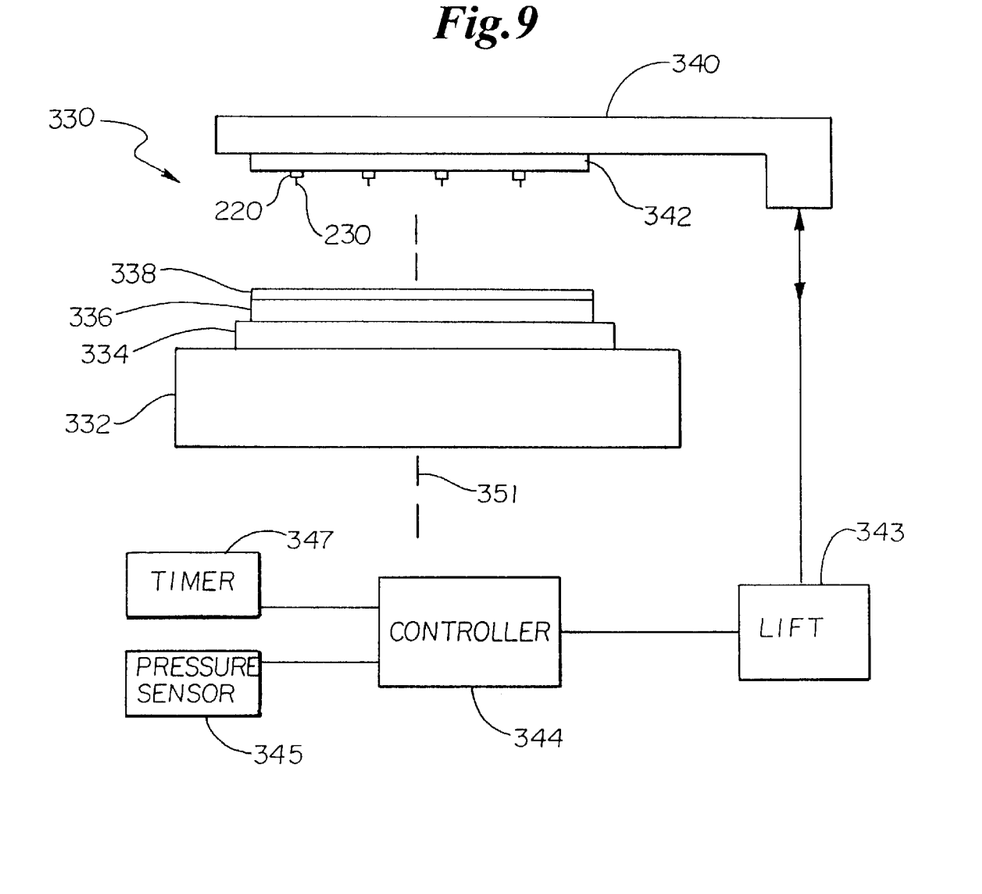
FIG. 9 schematically shows mechanism for removing epoxy and hackles from a plurality of ferrules.

It will be appreciated that the epoxy removal step 130 in FIG. 3 can be accomplished by any number of different techniques. For example, the hackle 230 and residue epoxy 226 can be removed by a hand-polishing process. However, to enhance conformity between ferrules, it is desirable to use a machine polishing process to remove the hackle 230 and residue epoxy 226. FIG. 9 illustrates an exemplary system 330 for removing epoxy and hackles from a plurality of ferrules. The system 330 includes a drive mechanism 332 for moving a platform 334. A polishing pad 336 is mounted on the platform 334. A polishing film 338 is mounted on the pad 336. Movement of the platform causes movement of the pad 336 and the film 338.

The system 330 also includes an arm 340 for holding a fixture 342. The fixture is preferably adapted for clamping a plurality of ferrules simultaneously. Further details regarding a suitable fixture can be found in U.S. patent application Ser. No. 09/400,334 which was filed on Sep. 21, 1999, and is hereby incorporated by reference in its entirety. The fixture 342 can be fastened to the arm 340, or set within a cradle defined by the arm 340 and held in place by gravity.

Referring still to FIG. 9, the arm 340 is raised and lowered by a mechanical lift 343 that can have any number of known conventional mechanical configurations. The lift 342 is controlled by a controller 344. The controller can interface with a pressure sensor 345 for determining the polishing pressure applied to the ferrules held by the fixture, and also can include a timer 347 for monitoring the elapsed time of a given polishing sequence.

The polishing film 338 can include any number of different types of polishing materials. Example films include a 12 micron aluminum oxide polishing film, a 30 micron silicon carbide polishing film or a 5 micron diamond polishing film. The pad 336 can also have a variety of configurations. In one embodiment, the pad 336 has a durometer of 70–90 and a thickness of about 5 millimeters.

Figure 4:
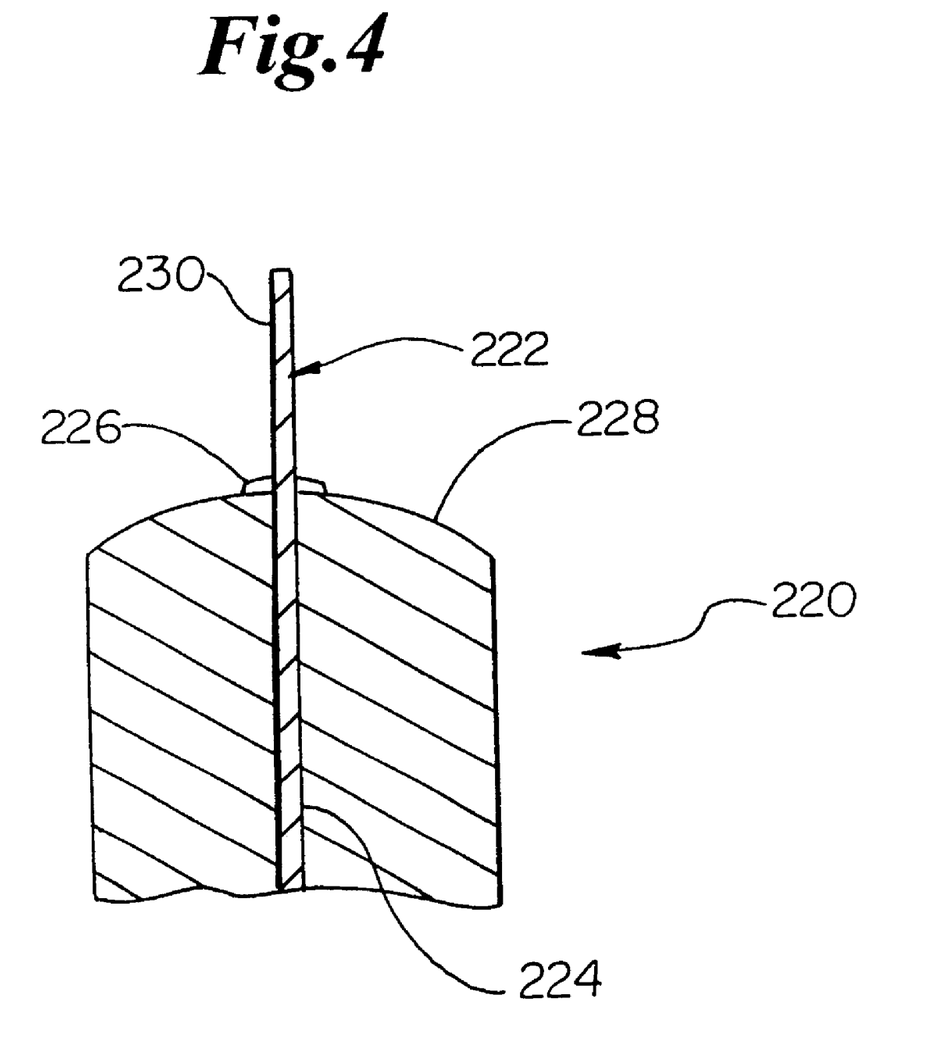
FIG. 4 illustrates a ferrule containing an optical fiber that has been cleaved and bonded to the ferrule.

In use of the system, the fixture 342 is loaded with ferrules having hackles 230 and residue epoxy 226 as shown in FIG. 4. The fixture 342 is then connected to arm 340. Drive mechanism 332 is then actuated causing platform 334, pad 336 and polishing film 338 to rotate. In certain embodiments, the platform 334 can rotate in an orbital motion about a central drive axis 351 of the drive mechanism 332. In other embodiments, the platform 334 can be moved in other oscillating motions or patterns. With the drive mechanism 334 actuated, the controller 344 causes the lift 343 to lower the fixture 342 toward the polishing film 338. The lift 342 lowers the arm 340 until the end faces of the ferrules held by the fixture 342 contact the polishing film 338. The polishing pressure can be determined by the pressure sensor 345, and controlled by the controller. In certain embodiments, the polishing pressure is provided by the weight of the fixture 342. In one non-limiting invention, the polishing pressure is approximately 1.5 pounds distributed between twelve ferrules. After a predetermined polish time, as indicated by the timer 347, the controller 344 causes the lift 343 to lift the arm 340. With the arm 340 lifted, the fixture 342 can be removed and used in a subsequent polishing process. While the fixture 342 has been described as being capable of holding 12 ferrules, it will be appreciated that fixtures having capacities other than 12 can also be used.

It is preferred to use a mechanical/automated polishing process to improve the uniformity of polishing results. In the depicted embodiment, the polishing film 338 is moved by drive mechanism 332. In other embodiments, relative movement between the ferrules and the polishing film 338 can be provided by moving the fixture 342 relative to the film.

III. Detailed Example of Apex and Radius Forming, Fiber Recessing, and Final Polishing Methods FIG. 10 illustrates a polishing system 430 adapted for use in conducting the polishing steps 132, 134 and 136 of FIG.

3. The system 430 includes a drive mechanism 432 for moving a platform 434. In one embodiment, the movement of the platform 434 is orbital about a central axis 437. However, in other embodiments, the movement can be oscillating or random. The platform 434 can also be moved in a manner similar to an X-Y motion table.

Figure 10:
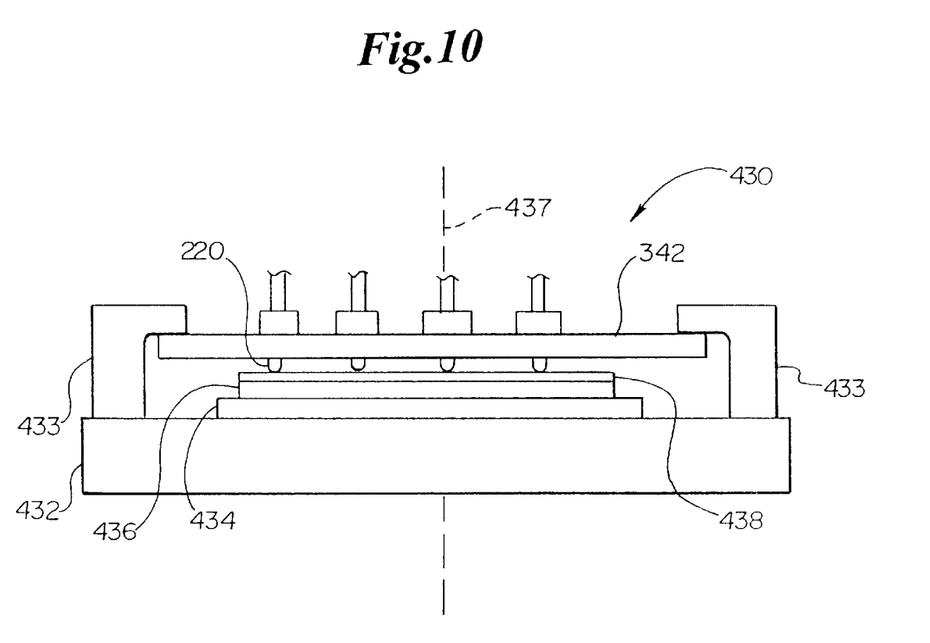
FIG. 10 schematically shows a polishing machine for polishing a plurality of ferrules.

Referring still to FIG. 10, a polishing pad 436 is mounted on the platform 434, and a polishing film 438 is mounted on the pad 436. The fixture 342 is preferably clamped over the drive mechanism 432 such that a predetermined contact pressure is provided between the end faces of the ferrules and the polishing film 438. In one embodiment, the fixture 342 is clamped at four locations by four clamps 433 (only two shown). In such an embodiment, an 8 pound load is distributed over the 12 ferrules held by the fixture 342. With the fixture 342 clamped in place, the drive mechanism 432 is activated causing the film 438 to polish the ferrule end faces.

For the apex and radius development step 132 of FIG. 3, a variety of different polishing films and pads can be used. In one non-limiting embodiment, the polishing pad 436 has a durometer in the range of 45 to 90. In this embodiment, a polishing film such as a 6 micron diamond polishing film can initially be mounted on the pad 436 and used to polish the ferrules. Subsequently, the 6 micron film can be replaced with a finer polishing film. For example, a subsequent apex and radius development polishing step can include a 1 micron diamond polishing film mounted on the pad 436.

After the ferrule has been rounded to a desired radius and apex, the polishing system 430 can be used to recess the end of the fiber 222 relative to the end face 228 of the ferrule as indicated by step 134 of FIG. 3. For example, in one embodiment, a cerium oxide ($CeO_2$ also referred to as ceric oxide or cerium dioxide) polishing film can be used on a polishing pad having a durometer in the range of 60 to 90. When the ferules 220 held by the fixture 342 are polished by the cerium oxide film, the glass fibers within the ferrules react with the cerium oxide causing the index layers to be removed. During the process, the drive mechanism 432 rotates the cerium oxide film to provide agitation for enhancing the chemical reaction. In one non-limiting embodiment, the tip of the fiber can be recessed about 100 to 600 nanometers relative to the end face of the ferrule. Preferably, the tip is recessed a distance sufficient to completely remove the index layer from the tip.

In one embodiment, the final polish step 136 of FIG. 3 is accomplished by replacing the cerium oxide film with a final polish film. While any number of different types of final polish films can be used, a preferred film is a 1 micron or smaller silicon dioxide film. A preferred film is a 2 micron silicon dioxide film. Once the final polish film has been placed on the polishing pad 436, the fixture holding the 12 ferrules is clamped into place. The drive mechanism 432 is then actuated causing the final polish film to polish the end faces of the ferrules. Preferably, the end faces are polished until the end faces are flush with the recessed tips of the fibers.

While specific polishing film and pad types have been disclosed herein, it will be appreciated that the broad concept of the present invention relates generally to recessing the fiber tip prior to the final polish step. The exact technique used for recessing the end fiber or conducting the final polish step can be varied according to numerous known polishing techniques without departing from the principles of the present invention.

I claim:

1. A method for polishing a ferrule including an optical fiber, the ferrule including an end face, the method comprising:
   recessing an end of the optical fiber relative to the end face of the ferrule; and
   polishing the end face of the ferrule after the end of the fiber has been recessed relative to the end face of the ferrule.

2. The method of claim 1, wherein the end face of the ferrule is polished until the end of the optical fiber is flush with the end face of the ferrule.

3. The method of claim 1, wherein the face of the fiber is recessed relative to the end face of the ferrule by polishing the end face of the ferrule with a cerium oxide film.

4. The method of claim 1, wherein the end face of the ferrule is polished with a polishing film having a coarseness less than 1 micron.

5. The method of claim 4, wherein the polishing film includes silicon dioxide.

6. The method of claim 3, wherein the polishing film includes silicon dioxide.

7. A method for polishing a ferrule including an optical fiber, the ferrule including an end face, the method comprising:
   removing a hackle of the optical fiber;
   polishing a radius and apex into the end face;
   recessing an end of the optical fiber relative to the end face of the ferrule; and
   final polishing the end face of the ferrule after the end of the fiber has been recessed relative to the end face of the ferrule.

8. The method of claim 7, wherein the end face of the ferrule is polished until the end of the optical fiber is flush with the end face of the ferrule.

9. The method of claim 7, wherein the face of the fiber is recessed relative to the end face of the ferrule by polishing the end face of the ferrule with a cerium oxide film.

10. The method of claim 7, wherein the end face of the ferrule is polished with a polishing film having a coarseness less than 1 micron.

11. The method of claim 10, wherein the polishing film includes silicon dioxide.

12. The method of claim 9, wherein the polishing film includes silicon dioxide.

13. A method for polishing a ferrule including an optical fiber, the ferrule including an end face, the method comprising:
   polishing the end face with a first polishing film;
   recessing an end of the optical fiber relative to the end face of the ferrule; and
   polishing the end face of the ferrule with a second polishing film after the end of the fiber has been recessed relative to the end face of the ferrule, the second polishing film having a finer coarseness than the first polishing film.

14. The method of claim 13, wherein the end face of the ferrule is polished with the second polishing film until the end of the optical fiber is flush with the end face of the ferrule.

15. The method of claim 13, wherein the face of the fiber is recessed relative to the end face of the ferrule by polishing the end face of the ferrule with a cerium oxide film.

16. The method of claim 13, wherein the second polishing film has a coarseness less than 1 micron.

17. The method of claim 16, wherein the second polishing film includes silicon dioxide.

18. The method of claim 15, wherein the second polishing film includes silicon dioxide.

19. The method of claim 13, wherein the end of the fiber is recessed a distance sufficient to remove an indexing layer.

20. The method of claim 13, wherein the end of the fiber is recessed 100–600 nanometers.

* * * * *